Patented Oct. 21, 1941

2,260,148

UNITED STATES PATENT OFFICE 2,260,148

CHEWING GUM MATERIAL

Louis William Mahle, Philadelphia, Pa., assignor to Frank H. Fleer Corporation, Philadelphia, Pa., a corporation of Delaware No Drawing. Application June 19, 1939, Serial No. 279,993

13 Claims. (Cl. 99—135)

This invention relates to a chewing gum material and it comprises a chewing gum base containing an ester gum made from a rosin which has been at least partially hydrogenated.

Chewing gum base is essentially composed of an elastic, chewable material, such as chicle, the various guttas, and plasticizers. The guttas are materials like gutta jelutong, Red Niger, and Katiau. These gutta substances contain about 25% of a rubbery material generally known as "gutta," together with about 75% of resinous substances. Ordinary rubber, generally derived from rubber latex solids, has also been used as the gutta, or elastic constituent in chewing gum.

A satisfactory chewing gum base cannot be easily prepared from natural guttas unless plasticizing agents are also incorporated. Many plasticizers have been used. These substances are generally resinous materials, such as paracoumarone and waxes, and the like. Fatty substances, such as hydrogenated fats are also added, together with fillers, such as chalk.

One of the main problems in making a satisfactory chewing gum base is to select plasticizers which are inexpensive and at the same time function well but without the development of any undesirable taste. Moreover, the chewing gum in final form should resist oxidation. The paracoumarone resins are advantageous materials for use as plasticizers but are relatively expensive, and tend to contribute a tarry odor and taste. What the art desires is a relatively inexpensive plasticizer which blends readily with the other constituents in the chewing gum base but which is relatively free of any undesirable flavor.

Of the many substances used as plasticizers, the ordinary rosin ester gums have been suggested, but they have not been found suitable. Rosin ester gums are plastic substances which soften on heating and are the product of esterifying rosin with a polyhydroxy alcohol, such as glycerine or glycol. This esterification can be conducted in ways well known in the art and for best results with respect to flavor the rosin should be esterified until its acid number decreases to 5 or less. The esters have many advantages with respect to cost, but they generally impart undesirable flavor to the chewing gum. Of even greater disadvantage is the fact that chewing gum products made with these rosin ester gums undergo progressive deterioration so that the chewing gum, if allowed to stand on a dealer's shelves for any long period of time begins to crumble or get sticky. Even when the flavor is fairly satisfactory as first made, this deterioration appears to impart bitterness as time goes on.

I have now discovered that a satisfactory chewing gum base can be prepared when using rosin ester gums provided the ester is one which has been made from a rosin which has been at least partially hydrogenated. These partially or wholly hydrogenated ester gums exhibit no tendency to oxidize or deteriorate. In fact they appear to inhibit any tendency for the rubber or gutta constituents in the chewing gum base to deteriorate and crumble. In consequence, the hydrogenated ester gums of the present invention not only act as very desirable plasticizers; they additionally function to prevent any tendency for the prepared chewing gum to crumble during prolonged storage.

The hydrogenated rosin ester gums used in the present invention can be prepared by well known ways from a wholly or partially hydrogenated rosin and a polyhydroxy alcohol. Ordinary rosin, consisting essentially of abietic acid, has an iodine number of about 115. Before preparing the ester gum the rosin is hydrogenated to iodine numbers of less than about 50. Methods for hydrogenating rosin are a part of the prior art and form no part of the present invention. After the rosin has been hydrogenated it is then esterified with glycerine or glycol in the usual way to make the ester gum.

Particularly suitable ester gums can be prepared from fully hydrogenated rosin but the essential thing in the present invention is that the rosin, before esterification, shall be hydrogenated to such a degree that the resulting ester gum is free of undesirable flavor and shows prolonged resistance to oxidation.

The hydrogenated rosin ester gums of the present invention can be purchased in the open market and I lay no claim to any way of making them.

I shall now give typical formulas for chewing gum base products using the stabilized rosin ester gums.

BASE FOR BUBBLE TYPE CHEWING GUM
(on dry basis)

(1)

| | Per cent |
|---|---|
| Gutta jelutong | 40 |
| Hydrogenated rosin ester gum | 24 |
| Rubber latex | 8 |
| Chalk | 8 |
| Hydrogenated fat | 20 |
| | 100 |

(2)

| | Per cent |
|---|---|
| Gutta jelutong | 30 |
| Hydrogenated rosin ester gum | 16 |
| High melting point para-coumarone resin | 16 |
| Rubber latex | 9 |
| Whiting | 7 |
| Candelilla wax | 22 |
| | 100 |

BASE FOR SOFTER CHICLE-LIKE CHEWING GUM
(*on dry base*)

(3)

| | Per cent |
|---|---|
| Gutta jelutong | 50 |
| Red Niger gutta | 10 |
| Hydrogenated rosin ester gum | 20 |
| Candelilla wax | 20 |
| | 100 |

There can be rather wide variation in the proportions given above. For example, the amounts of coumarone resin given in Formula 2 can be decreased to 10% and the amount of hydrogenated rosin ester gum increased to 22%. The above formulas are intended to be typical of the constituents, with the exception of the hydrogenated rosin ester gum, hitherto used in chewing gum products. Those skilled in the art will appreciate that many variations in the formulas may be made without departing from the essence of the present invention.

Other gutta products can, of course, be used, such as gutta Banger soh and gutta siak.

The hydrogenated rosin ester gum given in the above formulas is made by esterifying partially or wholly hydrogenated rosin with glycerol. The glycol esters can be used in the same amounts instead of the glycerol esters. The hydrogenated rosin has an iodine number of about 25 to 50 but can be wholly hydrogenated with equal results. The acid number of the ester should be less than 9 or 10 in order to avoid any bitter flavor in the final gum. I do not wish to be restricted to these values however, since esters having higher acid numbers could be used and neutralizing agents incorporated in the chewing gum base.

In preparing chewing gum using the hydrogenated esters of the present invention the method of incorporating the ingredients is identical with that hitherto used in the art. The gutta constituents and plasticizers are mixed together in suitable mixing devices in the usual way and I lay no claim to any particular order of mixing since that is not the essence of the present invention.

Having thus described my invention, what I claim is:

1. Chewing gum material containing a polyhydroxy alcohol ester of a hydrogenated rosin.
2. Chewing gum material containing a glycol ester of a hydrogenated rosin.
3. Chewing gum material containing a glycerol ester of a hydrogenated rosin.
4. Chewing gum material containing gutta and a polyhydroxy alcohol ester of a hydrogenated rosin.
5. Chewing gum material containing gutta and a glycerol ester of a hydrogenated rosin.
6. Chewing gum material containing gutta, latex solids, and a polyhydroxy alcohol ester of a hydrogenated rosin.
7. Chewing gum material containing gutta, latex solids, and a glycerol ester of a hydrogenated rosin.
8. Chewing gum material containing gutta, latex solids, and a glycol ester of a hydrogenated rosin.
9. A chewing gum base containing a polyhydric alcohol ester of hydrogenated rosin.
10. A chewing gum base containing a glyceryl ester of hydrogenated rosin.
11. A chewing gum base containing a glyceryl ester of hydrogenated rosin, the hydrogenated rosin nucleus of said ester having an iodine number of less than about 50.
12. A chewing gum base containing a glyceryl ester of hydrogenated rosin and a gutta material.
13. A chewing gum material comprising chicle and a polyhydric ester of a hydrogenated rosin.

LOUIS WILLIAM MAHLE.